April 6, 1926.
W. E. GREENAWALT
METALLURGICAL PROCESS
Filed Jan. 27, 1925
1,579,356
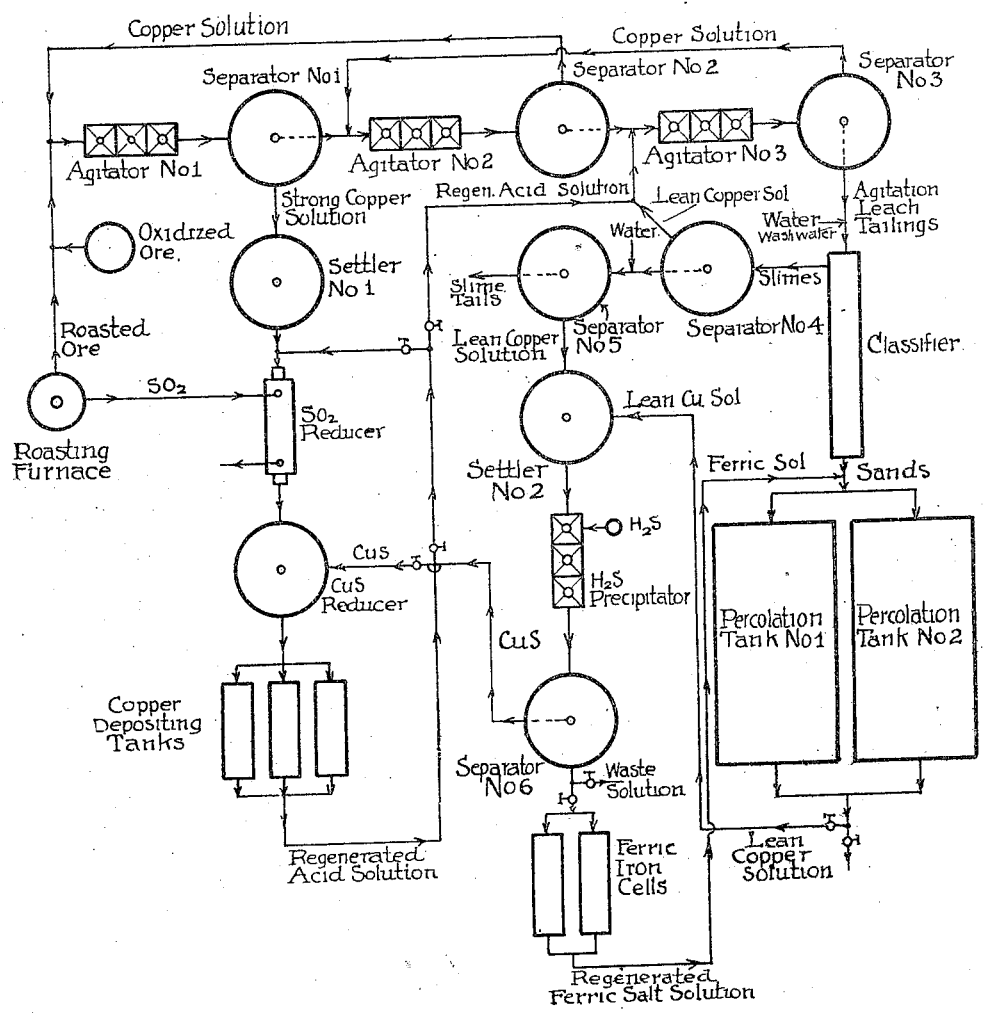
INVENTOR
William E. Greenawalt.

Patented Apr. 6, 1926.

1,579,356

UNITED STATES PATENT OFFICE.

WILLIAM E. GREENAWALT, OF DENVER, COLORADO.

METALLURGICAL PROCESS.

Application filed January 27, 1925. Serial No. 5,141.

*To all whom it may concern:*

Be it known that I, WILLIAM E. GREENA-WALT, a citizen of the United States, residing in the city and county of Denver and State of Colorado, have invented certain new and useful Improvements in Metallurgical Processes, of which the following is a specification.

My invention relates to metallurgical processes, and has as its object the effective extraction of metals—especially copper—from their ores and concentrates.

The invention will be described more particularly in its application to the extraction of copper from its ores, although it will be understood that it is applicable to the extraction of other metals, such as gold, silver, lead, zinc, etc.

It has been observed in leaching copper and other ores, especially with an acid solution, that most of the copper is quickly dissolved, and a considerable amount of very fine slime is formed as a result of the chemical action on the ore. This is largely, although not entirely, due to the formation of calcium sulphate as a result of the acid acting on the slime which is always more or less associated with copper ores. This slime, together with the fines produced by crushing the ore to the desired fineness for effective treatment, makes it difficult, and in most cases quite impractical, to treat copper ore with an acid solution by percolation. The fines produced by the crushing, together with the slimes formed by the chemical reactions in leaching, clog the interstices of the ore charge and retards the percolation to an impractical degree.

It has been observed that the copper in the fines produced by crushing, is quickly dissolved, say in a few hours, while the copper in the sands, or coarser material, usually requires a much longer time for satisfactory extraction, usually several days, and sometimes several weeks, especially if some of the copper is in the form of sulphide, such as chalcocite, or in the form of a silicate, such as chrysocolla, when a considerable time is required to make a satisfactory extraction of the copper by leaching.

It has also been frequently observed, in treating high grade ore or concentrate by percolation with an acid solution, that the solution is quite likely to become so charged with copper sulphate, that the sulphate crystallizes in the charge and stops further percolation. When this happens, the charge has to be removed from the tank and the difficulty remedied before further progress can be made. This is true, as to crystallization, either with sulphate or chloride solutions, and great care is required in percolating a rich copper ore charge that the solution is maintained sufficiently dilute in both acid and copper to avoid crystallization of the copper salt in the ore mass.

It has also been observed that, if the ore is given a preliminary treatment, say by agitation, most of the copper can be extracted in a comparatively short time, and that most of the slime that will form due to the action of the acid on the ore, will be formed during this short preliminary treatment, and that if the sands or coarser material is then separated from the fines and slimes, comparatively little more slime will be formed by prolonged treatment, and that the ore, stripped of its excessive fines and slimes, may then be percolated quite satisfactorily to the extent desired to get a very high extraction of the copper from the sands.

The present process is based on these observations, and it can best be described by referring to the accompanying drawing, which is a flow sheet in diagrammatic plan, and illustrates the preferred method of carrying it out.

The fresh ore, crushed to suitable fineness for satisfactory treatment by agitation, say from 4 to 12 mesh, is fed into agitator No. 1 in a regulated stream, determined by the capacity of the plant, where it is agitated with copper solution from the treatment of previous charges, in agitators No. 2 and No. 3. The strong acid solution is fed into agitator No. 3, where it is agitated with the partly treated ore from agitators No. 1 and No. 2. Each agitation unit comprises an agitator and a separator, and a good working plant will usually comprise a number of these agitation units, arranged in series. The ore and the solution flow concurrently through each unit of the series comprising an agitator and a separator, and counter currently through the series of agitation units.

The ore fed into agitator No. 1 is there treated until the solution becomes enriched in copper to the extent desired, and usually until most of the acid is consumed, and the solution is preferably neutral or nearly neutral. In any case a large excess of acid is not desired, although the process will work well with considerable excess acid. The mixture of ore and solution, or pulp, flows in a continuous stream into separator No. 1, where the ore and solution are separated. This separation need not be complete, and can be made in an ordinary separator, or thickener, commonly used for such purposes. The copper solution flows into settler No. 1, where it is clarified and stored for further treatment, as desired. The thickened pulp from separator No. 1 flows into the agitator No. 2, where it is given further treatment with the solution containing copper and acid from separator No. 3. The agitated mixture then flows into separator No. 2, where the ore and solution are again separated, as in unit No. 1. The solution flows into agitator No. 1, while the thickened pulp flows into agitator No. 3, where the agitation is repeated with fresh acid solution, preferably obtained by the precipitation of the copper from the leach solution by electrolysis. The agitated pulp from agitator No. 3 flows into separator No. 3, and the process is so regulated that the pulp flowing into separator No. 3 will be sufficiently treated, both with respect to the extraction of the copper and the formation of slimes, that the subsequent steps may be carried out advantageously as determined by experience for each particular ore.

The copper solution from separator No. 3 flows into agitator No. 2, and the ore pulp flows into a classifier, in which the ore fines and slimes are separated from the sands. As is well known, these classifiers can be adapted to make any desired separation between the slimes and the sands, as experience will dictate for any particular ore. Usually, considerable amount of fines, but not slimes, can go with the sands, without seriously interfering with the subsequent percolation of the sands. The sands are flowed into the percolation tanks No. 1 and No. 2, for further treatment by percolation.

The slime pulp flows into separator No. 4 where the richer copper solution is separated from the slime, and the copper solution so separated flows into agitator No. 3, with fresh acid solution, and is gradually worked up to rich copper solution for the regular precipitation of the copper. The residual slime is washed, as in separator No. 5, and may be wasted, or given further treatment by flotation if the slime contains fine sulphides and then wasted. The lean copper solution, or wash water, flows into settler No. 2, where it is stored and clarified, after which it is precipitated with a suitable chemical reagent, such as metallic iron or hydrogen sulphide, preferably with hydrogen sulphide in the $H_2S$ precipitator. The mixture of liquid and $CuS$ precipitate flows into separator No. 6, where the $CuS$ is separated from the lean or foul solution. The lean wash water may be wasted. The foul solutions from acid leaching, usually charged with salts of iron, are used to treat the sands by percolation, as will be referred to later.

The clarified strong copper solution in settler No. 1 is electrolyzed in the copper depositing tanks to deposit the copper as the electrolytic metal and to regenerate acid for leaching the copper from the ore. In leaching copper ores with acid solutions iron is always dissolved with the copper, and this iron in the solution plays an important part in the deposition of the copper. Ferrous iron in the electrolyte is practically harmless and may be beneficial, while ferric iron in the electrolyte is highly detrimental. In order to convert the harmful ferric iron into the harmless ferrous iron, the solution is reduced with sulphur dioxide in the $SO_2$ reducer, with sulphur dioxide obtained from roasting sulphide ore or concentrate in the roasting furnace. The reduced solution from the $SO_2$ reducer may be electrolyzed direct, but it is preferred to also subject it either in whole or in part, to $CuS$ reduction, with the $CuS$ precipitate obtained in the precipitation of the lean and foul solutions with the $H_2S$ referred to. In this way the copper of the precipitate is converted into the electrolytic metal.

From the $CuS$ reducer the reduced copper solution flows into the electrolytic copper depositing tanks, where the copper is deposited as the electrolytic metal, with the simultaneous regeneration of acid and ferric iron. The solution is passed through the copper depositing tanks at a rate so that the ferric iron formed will preferably not exceed 0.25%, although the amount of ferric iron in the effluent solution may vary, and the 0.25% is simply stated as a convenient practical limit. The solution from the copper depositing tanks is returned to the $SO_2$ reducer and circulated in a sort of closed circuit between the reducer and copper depositing tanks to remove the desired amount of copper, while at the same time a portion, the advance flow, or the stream of solution flowing through the entire leaching and electrolytic circuit, is flowed into agitator No. 3, to make another complete cycle. The details of this operation is more fully described in my Patents No. 1,353,995, Sept. 28, 1920, and No. 1,483,056, Feb. 5, 1924.

It is evident that by circulating the solution in a sort of closed circuit as described, iron is all the while accumulating in the solution, and in due course the solution will contain an undesirable and an impractical amount of iron for effective work either for leaching or electrolytic precipitation. A predetermined amount of this foul solution is therefore allowed to pass over with the ore from separator No. 3 to the classifier, while a similar amount of water is added to make up the volume of solution to its original amount. In this way the regular leach solution may be kept at any desired standard of purity or impurity, as found best by experience for each particular condition.

The foul solution, high in iron, is then separated from the slime in separators No. 4 and No. 5, and the copper precipitated from this foul solution as already described, preferably with hydrogen sulphide, which is capable of precipitating copper from acid solutions and of regenerating an equivalent of acid for the copper precipitated, and this acid is advantageous in producing ferric iron. The foul solution, with the copper sulphide precipitate, flows into separator No. 6, where the CuS is separated from the clear solution. The CuS goes to the CuS reducer in the electrolytic circuit. The clear foul high-iron solution flows into the ferric iron cells, where ferrous iron in the solution is converted into the ferric condition, and this ferric iron solution is then used to leach the ore sand in the percolation tanks. Copper, in some of its combinations in ores, is more susceptible to close extraction with a ferric salt solution than with a straight acid solution, and when the two are combined, a very effective solvent is obtained, and a high percentage of extraction of the copper from the sands is practical. In this way the foul solutions, as also the wash waters, may be used to advantage. The lean copper solution from the percolation tanks is preferably joined with that from the slimes for convenience in precipitation.

In separating the residue from the solution in separator No. 3, and in the classifier, it is not intended to wash the sands to remove all the soluble copper. The process is preferably worked so that only enough water is added at either of these places to maintain the solution of the leaching and electrolytic circuit at a predetermined standard. This greatly simplifies the treatment, for the reason that washing to remove all the soluble metal content from leach residues is usually one of the outstanding problems in any leaching process.

The percolation tanks are made large relative to the daily capacity of a plan to give ample time for percolation treatment of the sands, and so that one tank can be under treatment a sufficient time while the other is being filled.

The ferrous iron in the foul copper-barren solution may be conveniently converted into the ferric condition by electrolysis, altho any other method may be used. Electrolysis, however, offers certain advantages, in that the acid resulting from the copper precipitation is a help in converting ferrous iron in the foul solution to ferric iron by electrolysis, since the ferric iron is formed to some extent at the expense of the acid, and insoluble basic salts are avoided, as in the case of the conversion of the ferrous iron to the ferric iron in neutral solutions. It has been found difficult to precipitate the copper by electrolysis, from solutions containing salts of iron, with the simultaneous regeneration of a large amount of ferric iron in the electrolyte, but when the copper is first precipitated from the solution, the production of ferric iron is greatly simplified.

The water added to the regular leach solution in the agitation circuit, is preferably added at the classifier in an amount equal to that consumed or diverted from the circuit. An equivalent of foul solution will pass over with the slimes, or with the sands into the percolation tanks. While the sands separated in the classifier may be washed to any extent desired, the process is simplified by passing the ore sands from the classifier directly into the percolation tank, so that further treatment of the sands can commence at once, and the final washing may be done by percolation and to any extent desired, since the excess dilute wash waters from the percolation tanks may be wasted after the copper has been precipitated from them.

It is preferred to pass all of the foul solutions and most or all of the wash water from previous use through the percolation tanks before letting the solutions go to waste. In the operation of an electrolytic, or acid regenerative process, in the treatment of sulphide copper ore or concentrate, more acid is formed than is used in the regular operation of the process. By applying this excess acid for a relatively long time to the large volume of ore in the percolation tanks, the excess acid is largely consumed in doing useful work in extracting a large percentage of the copper which can be extracted with more or less difficulty, and thus the application of the foul solutions to the sands in the percolation tanks works to advantage both ways.

Usually foul solutions, as they are generally discarded, have a potential solvent power for metals, especially if the dissolved metals are precipitated with the simultaneous regeneration of the solvent, such as acid, or ferric iron, either chemically or electrolytically. When the slimes are removed from the partly treated ore, the impurity of the solution does not make so much difference in the percolation treatment as when the slimes are not removed. If the sands in the percolation tanks contain copper which is soluble in an acid solution, the simple foul acid solution is applied to the sands without any special further treatment, if, however, the sands contain copper in a form not readily soluble in a simple acid solution, such as some form of sulphide, it is desirable to treat the ordinary foul solution to convert ferrous iron into ferric iron, and then leach the sands with the acid ferric iron solution.

The foul solution may be used in a closed circuit between the precipitator and the percolation tanks, and if ferric salt regeneration is desired, the ferric iron cells may be included in the circuit, and only the more or less dilute wash waters wasted from this circuit.

I claim:

1. A process of treating copper ores comprising, agitating the ore with an acid solution to extract a portion of the copper, separating the copper solution from the ore and separating the ore sands from the ore slimes, precipitating the copper from the copper solution obtained by agitation, and then treating the sands by percolation with said barren solution from which the copper was precipitated.

2. A process of treating copper ores comprising, agitating the ore with an acid solution to extract a portion of the copper, separating the resulting copper solution from the ore and separating the ore sands from the ore slimes, precipitating the copper from the copper solution obtained by agitation with the simultaneous regeneration of acid, and then treating the sands by percolation with the resulting solution to extract another portion of the copper from the sands.

3. A process of treating copper ores comprising, agitating the ore with an acid solution to extract a portion of the copper, separating the resulting copper solution containing salts of iron from the ore and separating the ore sands from the ore slimes, precipitating the copper from the copper solution containing salts of iron, treating the resulting depleted copper solution containing salts of iron to convert the ferrous iron into the ferric condition, and then treating the sands by percolation with said ferric salt solution to extract another portion of the copper from the sands.

4. A process of treating copper ores comprising, agitating the ore with an acid solution to extract a portion of the copper, separating the resulting copper solution containing salts of iron from the ore and separating the ore sands from the ore slimes, precipitating the copper from the copper solution with the simultaneous regeneration of acid, treating the resulting depleted copper solution containing salts of iron to convert the ferrous iron into the ferric condition, and then treating the sands by percolation with said acid ferric salt solution to extract another portion of the copper from the sands.

5. A process of treating copper ores comprising, agitating the ore with an acid solution to extract a portion of the copper, separating the resulting copper solution from the ore and separating the ore sands from the ore slimes, electrolyzing the resulting copper solution obtained by agitation to deposit the copper and regenerate acid, and then treating the sands by percolation with the regenerated acid solution so obtained to extract another portion of the copper from the sands.

6. A process of treating copper ores comprising, agitating the ore with an acid solution to extract a portion of the copper, separating the resulting copper solution from the ore and separating the ore sands from the ore slimes, electrolyzing the resulting copper solution obtained by agitation and containing salts of iron to deposit the copper and regenerate acid and ferric iron, then electrolyzing the depleted copper solution to convert the ferrous iron in the solution into the ferric condition, and then treating the ore sands by percolation with the regenerated acid and ferric salt solution so obtained to extract another portion of the copper from the sands.

7. A process of treating copper ores comprising, agitating the ore with an acid solution to extract a portion of the copper, separating the resulting copper solution from the ore and separating the ore sands from the ore slimes, electrolyzing the resulting copper solution containing salts of iron obtained by agitation to deposit the copper and regenerate acid and ferric iron, returning the electrolyzed solution to the agitator and repeating the cycle of leaching and electrolysis until the copper solution becomes charged with iron and other impurities, then treating the ore sands by percolation with a portion of the foul solution obtained from the cyclic treatment of the ore by agitation and electrolysis to extract another portion of the copper from the ore sands.

8. A process of treating copper ores comprising, agitating the ore with an acid solution to extract a portion of the copper, separating the resulting copper solution from the ore and separating the ore sands from the ore slimes, electrolyzing the resulting copper solution containing salts of iron to deposit the copper and regenerate acid and ferric iron, applying a reducing agent to the electrolyte, circulating a portion of the solution in a closed circuit between the copper depositing tanks and the reducer and another portion through the complete agitation and electrolytic circuit until the solution becomes charged with iron and other impurities, then diverting a portion of the foul solution from the agitation and electrolytic circuit and precipitating the copper therefrom, and then treating the ore sands by percolation with the resulting foul depleted copper solution to extract another portion of the copper from the ore sands.

9. A process of treating copper ores comprising, agitating the ore with an acid solution to extract a portion of the copper, separating the resulting copper solution containing salts of iron from the ore and separating the ore sands from the ore slimes, precipitating the copper from the resulting copper solution with the simultaneous regeneration of acid, returning the regenerated acid solution to the agitators and repeating the cycle of solution and precipitation until the solution becomes charged with iron salts and other impurities, then treating the ore sands by percolation with the resulting foul solution, precipitating the copper from the foul solution from the percolation tanks, returning the solution to the percolation tanks and continuing the cycle of circulation of the solution between the percolation tanks and the precipitator until the copper in the ore sands is sufficiently extracted.

10. A process of treating copper ores comprising, agitating the ore with an acid solution to extract a portion of the copper, separating the resulting copper solution containing salts of iron from the ore and separating the ore sands from the ore slimes, precipitating the copper from the resulting copper solution, returning the depleted copper solution to the agitators and repeating the cycle of solution and precipitation until the solution becomes charged with iron salts and other impurities, then treating said foul solution to convert ferrous iron into ferric iron and treating the ore sands by percolation with the resulting foul solution containing ferric iron, precipitating the copper from the foul solution from the percolation tank, again treating the depleted foul solution to convert ferrous iron to ferric iron and returning the foul ferric iron solution to the percolation tank, and continuing the cycle of percolation, precipitation, and regeneration of ferric iron until the copper in the ore sands is sufficiently extracted.

11. A process of treating copper ores comprising, agitating the ore with an acid solution to extract a portion of the copper, separating the resulting copper solution from the ore and separating the ore sands from the ore slimes, washing the slimes to remove the soluble copper therefrom, electrolyzing the copper solution from the agitator to deposit the copper and regenerate acid, returning the regenerated acid solution to the agitator and repeating the cycle of solution and electrolysis until the solution becomes fouled with impurities, then treating the ore sands by percolation with the foul solution from the electrolytic circuit, precipitating the copper from the foul solution from the percolation tanks and from the slime wash water, and applying the precipitated copper so obtained to the electrolyte whereby the copper of the precipitate is converted into the electrolytic metal.

12. A process of treating copper ores comprising, agitating the ore with an acid solution to extract a portion of the copper, separating the resulting copper solution from the ore, then adding wash water to the ore to make up for that lost or wasted in the operation of the process, and then separating the ore sands from the ore slimes, precipitating the copper from the copper solution from the agitator, and then treating the sands by percolation with the depleted copper solution from the agitator to extract another portion of the copper from the ore sands.

13. A process of treating copper ores comprising, agitating the ore with an acid solution to extract a portion of the copper, separating the resulting copper solution from the ore and separating the ore sands from the ore slimes, placing the ore sands only partly washed and still containing copper in solution in a percolation tank, precipitating the copper from the copper solution from the agitator and repeating the cycle of solution and precipitation until the solution in the agitation circuit becomes fouled with impurities, then treating the ore sands in the percolation tank with the foul solution from the agitation circuit to extract another portion of the copper from the ore sands.

14. A process of treating ores of metals comprising, passing the pulverized ore and the solvent for the metals counter-currently through a series of agitation units each unit comprising an agitator and a separator and concurrently through each of the agitation units of agitator and separator comprising the series of agitation units.

15. A process of treating ores of metals comprising, passing the pulverized ore and the solvent for the metals counter-currently through a series of agitation units each unit comprising an agitator and a separator for the ore and solution and concurrently through each of the agitation units comprising the series, separating the strong metal solution from the ore, precipitating the metals from the solution, and returning the barren solution to the ore.

16. A process of treating ores of metals comprising, passing the pulverized ore and the solvent for the metals counter-currently through a series of agitation units each comprising an agitator and a separator for the ore and solution and concurrently through each of the agitation units comprising the series, separating the metal solution from the ore and separating the ore sands from the ore slimes, precipitating the metals from the solution, and then treating the sands by percolation with said solution to extract another portion of the copper from the ore sands.

17. A process of treating ores of metals, comprising, agitating the pulverized ore with a solvent for the metals to extract a portion of the metals, separating the resulting metal solution from the ore and separating the ore sands from the ore slimes, precipitating the metals from the solution, treating the resulting barren solution to regenerate the solvent action for the metals, and then treating the sands by percolation with said regenerated solution.

18. A process of treating copper ores comprising, leaching pulverized unclassified copper ore with an acid solution relatively low in ferric iron to extract a portion of the copper, then separating the ore sands from the ore slimes, and then treating the ore sands by percolation with an acid solution relatively high in ferric iron.

19. In the treatment of copper ores in which a portion of the copper is readily soluble in dilute acid in a relatively short time and another portion soluble in dilute acid solution by prolonged treatment, the process comprising, subjecting the unclassified pulverized ore to the action of a dilute acid solution by agitation to extract the readily soluble copper, then classifying the partly leached ore into sands and slimes, and then treating the sands by percolation for a relatively long time with solutions previously used to extract the copper from the unclassified ore by agitation.

20. In the treatment of copper ores in which a portion of the copper is readily soluble in a relatively short time and another portion soluble by prolonged treatment, the process comprising, subjecting the unclassified pulverized ore to the action of the solvent by agitation to extract the readily soluble copper, then classifying the partly treated ore into sands and slimes, and then subjecting the sands for a relatively long time to the action of the solvent by percolation.

21. A process of treating copper ores comprising, agitating the ore with an acid solution to extract a portion of the copper, separating the resulting copper solution from the ore and separating the ore sands from the ore slimes, electrolyzing the resulting copper solution to deposit the copper and regenerate acid, returning the regenerated acid solution to the agitator to treat fresh ore and repeating the cycle of solution and electrolysis until the solution becomes fouled with impurities, treating the partly treated ore sands with the foul solution, chemically precipitating the copper from the foul solution, then electrolyzing the solution to convert ferrous iron to ferric iron, and then returning the foul solution to the partly treated sands.

WILLIAM E. GREENAWALT.